UNITED STATES PATENT OFFICE.

WALTER B. STARBIRD, OF STOCKTON, CALIFORNIA.

AERATED TONIC BEVERAGE.

SPECIFICATION forming part of Letters Patent No. 396,440, dated January 22, 1889.

Application filed August 21, 1888. Serial No. 283,375. (No specimens.)

*To all whom it may concern:*

Be it known that I, WALTER B. STARBIRD, a citizen of the United States, residing at Stockton, in the county of San Joaquin and State of California, have invented certain new and useful Improvements in Aerated Tonic Beverages; and I do declare the following to be a full, clear, and exact description of the invention, such as will enable others skilled in the art to which it appertains to make and use the same.

The said tonic medicine consists of the following ingredients, combined in the proportions and in the manner hereinafter stated, viz: First, I prepare a simple sirup composed of ten pounds of white granulated sugar and one gallon of water, specific gravity of 30°; second, I prepare a flavor composed of two ounces of oil of sassafras, one dram oil of cajeput, and ten grains attar of rose, with eleven ounces of alcohol; third, I prepare a solution of phosphate of iron composed of four ounces dry crystals phosphate of iron and seventeen ounces of fined warm water; fourth, I prepare a solution of tartaric acid composed of four pounds of tartaric acid and one gallon of fined water; fifth, I prepare a tincture of sarsaparilla composed of four pounds Honduras sarsaparilla-root ground and macerated in one and a half gallon each of alcohol and water and then leached off; sixth, I prepare a caramel for coloring composed of twenty pounds of burnt granulated sugar, to which three gallons of hot water is added.

To prepare for use, take of the above-described prepared ingredients and make a mixture thereof as follows, viz: Twelve gallons of the simple sirup, two ounces of the flavor, three ounces of the phosphate-of-iron solution, twenty-five ounces of the tartaric-acid solution, fifty ounces of the tincture of sarsaparilla, and one-third of a gallon of the caramel. When well mixed, the sirup is ready to be bottled, which bottles, preferably, should be of the size of "five to the gallon" and known as "5's," contents three ounces of the sirup to each bottle, filling it with carbonated water. When bottled, the sirup should be carbonated at a pressure of eighty pounds and tightly corked.

This compound may be taken by adults and children, and will be found to be of great benefit in regulating the bowels and purifying the blood. By its use the system is cleansed and invigorated, and its use is quite beneficial in scrofula and all skin diseases. It is also a very refreshing and cooling hot-weather drink. Adults may take from two to four tumblerfuls per day, and children in proportion to ages.

The "fined water" referred to is water purified without distillation.

What I claim, and desire to secure by Letters Patent of the United States, is—

The herein-described aerated tonic beverage, composed of granulated sugar, water, oil of sassafras, oil of cajeput, attar of rose, alcohol, phosphate of iron, tartaric acid, Honduras sarsaparilla, burnt sugar, and carbonated water, in the proportions specified.

In testimony whereof I affix my signature in presence of two witnesses.

WALTER B. STARBIRD.

Witnesses:
JOSHUA B. WEBSTER,
JAS. T. SUMMERVILLE.